(12) United States Patent
Asay

(10) Patent No.: US 7,555,842 B1
(45) Date of Patent: Jul. 7, 2009

(54) LINE LEVELING TOOL AND METHOD OF USE

(75) Inventor: Steve R. Asay, 8911 Northeastern Blvd., N.E. - #G-204, Albuquerque, NM (US) 87112

(73) Assignee: Steve R. Asay, Tijeras, NM (US)

( * ) Notice: Subject to any disclaimer, the term of this patent is extended or adjusted under 35 U.S.C. 154(b) by 288 days.

(21) Appl. No.: 11/371,591

(22) Filed: Mar. 9, 2006

Related U.S. Application Data

(60) Provisional application No. 60/660,110, filed on Mar. 9, 2005.

(51) Int. Cl.
*G01C 9/28* (2006.01)
*G01C 9/34* (2006.01)

(52) U.S. Cl. .............................. 33/373; 33/372; 33/384

(58) Field of Classification Search ................... 33/339, 33/347, 353, 369, 370, 371, 372, 373, 379, 33/380, 381, 382, 384, 390; 248/229.13, 248/229.16, 229.17; D10/69
See application file for complete search history.

(56) References Cited

U.S. PATENT DOCUMENTS

| | | | | | |
|---|---|---|---|---|---|
| 625,019 | A | * | 5/1899 | Cardell ........................ | 33/382 |
| 703,306 | A | * | 6/1902 | Roe ............... | 33/381 |
| 1,052,447 | A | * | 2/1913 | Armstrong ................... | 33/350 |
| 1,200,410 | A | * | 10/1916 | Chemrinsky ................. | 33/370 |
| 2,677,192 | A | * | 5/1954 | Anderson .................... | 33/372 |
| 2,820,302 | A | * | 1/1958 | Mitchell ..................... | 33/347 |
| 2,901,836 | A | * | 9/1959 | Hall ............................ | 33/373 |
| 3,146,529 | A | * | 9/1964 | Ogden ......................... | 33/370 |
| 3,589,021 | A | * | 6/1971 | Hall, Sr. ...................... | 33/372 |
| D255,504 | S | * | 6/1980 | Vanderwerf ................... | D10/74 |
| 4,335,522 | A | * | 6/1982 | Canfield ...................... | 33/353 |
| 4,580,350 | A | * | 4/1986 | Fincher ....................... | 33/334 |
| 4,663,856 | A | * | 5/1987 | Hall et al. ..................... | 33/373 |
| D290,445 | S | * | 6/1987 | Steckhahn .................... | D10/69 |
| 4,785,544 | A | * | 11/1988 | Heinsius et al. ............... | 33/334 |
| 4,829,676 | A | * | 5/1989 | Waldron ....................... | 33/372 |
| 4,970,796 | A | * | 11/1990 | Masters et al. ................ | 33/347 |
| 5,063,679 | A | * | 11/1991 | Schwandt .................... | 33/347 |
| 5,167,075 | A | * | 12/1992 | Weldy et al. .................. | 33/343 |
| D339,535 | S | * | 9/1993 | Wilson ........................ | D10/74 |
| 5,421,094 | A | * | 6/1995 | McCord et al. ............... | 33/373 |
| 5,819,425 | A | * | 10/1998 | Payne .......................... | 33/370 |
| 6,029,359 | A | * | 2/2000 | Szumer ....................... | 33/373 |
| 6,094,833 | A | * | 8/2000 | Medley, Jr. .................. | 33/770 |
| 7,059,059 | B1 | * | 6/2006 | Ames .......................... | 33/372 |
| 2006/0218754 | A1 | * | 10/2006 | Dobson ....................... | 24/3.1 |

FOREIGN PATENT DOCUMENTS

JP        2006064492 A    *    3/2006

* cited by examiner

*Primary Examiner*—R. A. Smith

(57) ABSTRACT

A leveling tool which can be attached quickly and simply to a utility service line, pipe, or cable and a method of use to check the line's, pipe's or cable's levelness and plumbness. In its preferred embodiment, the leveling tool comprises a base and two level vials attached to the base, to check a line's levelness and the line's plumbness. The leveling tool also comprises attaching means to attach the tools to the line or cable. The tool can be firmly attached to the line or cable and measure the line's levelness and plumbness via the appropriate level vial. The present invention, therefore, provides a more versatile and convenient leveling tool, one that can be quickly attached to a cable or line and left there indefinitely, while the user continues to work on the cable hands-free, and refer to the cable's levelness or plumbness at a glance.

5 Claims, 8 Drawing Sheets

LINE LEVELING TOOL AND METHOD OF USE

CROSS-REFERENCE TO RELATED APPLICATION

I hereby claim the benefit under Title 35, United States Code Section 119(e) of any United States Provisional application(s) listed below:

Application No. 60/660,110

Filing Date Mar. 9, 2005

BACKGROUND OF THE INVENTION

1. Technical Field of the Invention

This invention relates generally to leveling tools and to methods of using leveling tools, specifically to line levels that can be used to check utility cables such as telephone service or coaxial cables that are to be attached to a wall.

2. Description of the Background Art

The prior art discloses numerous leveling tools designed to accommodate specific functions. For example, there are levels that can be used to check the plumbness of two sides of a fence post at the same time. The prior art discloses levels used to attach to a string that will be leveled as a reference to something else to be leveled. The present application discloses and claims a level capable of being quickly attached to a utility service cable, such as a coaxial (cable TV) cable or a telephone service cable, to provide a quick reference as the cable is being attached to a wall.

Normally a cable TV or telephone service installer would, as one option, (if installing a cable on the side of a house, for example) attach the cable at one spot with a clip and screw, and then, holding the cable with one hand, move it into a position where it looks level or plumb to the naked eye. Alternatively, the installer would try to check whether a cable is accurately level by use of a commercially available level. The problem with "eyeballing" a cable to see if it is level or plumb while standing directly in front of it, is that its appearance will likely be distorted, making it necessary to attach the cable in a tentative position, step back to view it, then return, making any adjustments and then attaching it. The process can be laborious, time-consuming and it does not guarantee satisfactory results.

Using a traditional bar-shaped level would help eliminate the need to step back and "eyeball" the cable, and would of course give more accurate results. That process, however, would still require the step of holding it (the level) in place while positioning the cable, returning the level to the tool belt while holding the cable in place, and then retrieving the drill (and clip) to attach the cable in place. Perhaps the most efficient way to level a cable is to attach the cable at a high or low spot (assuming it's being installed vertically), then bring out the level, check its plumbness, and attach the cable at the other extreme (i.e. at the bottom of the wall if already attached at the top). The installer would then fill in the space between the top and bottom clips with the necessary (and usually required) extra screws and clips. The installer would have to use the latter approach to avoid having to pull out the level at each section of the installation. Installing a cable and leveling in that manner would still be undesirable or inconvenient for the installer, since it still requires extra time and work.

Another alternative approach would be to use a traditional level as set forth above and to have two people perform the leveling and installation task. The inefficiencies and additional costs of using two people are obvious.

By using a level which clips onto the cable the installer is now free to keep drill in hand, and attach the cable to the wall, section by section, with minimal or no time spent holding a level against the cable to check for plumbness.

SUMMARY OF THE INVENTION

The present application discloses and claims a level which measures both level and plumb (by means of one or a plurality of level vials), and can attach itself to cables, pipes, or other lines, of varying gauges and a method of using the level. The level attaches by means of one or a plurality of projections which extend from the level and attach by pressure to the given cable, wire, line, etc. These projections can take numerous forms. The preferred and alternative methods for verifying level and plumb on the level will also be shown and described in the accompanying drawings.

The most salient objects and advantages of the present invention are to provide: (1) an improved line level; (2) a quick and simple method of referring to a line's levelness or plumbness; (3) a line level which will accommodate, fit and attach to lines of various gauges; (4) a level which will free the user's hand or hands which would normally be used to hold a traditional level; and (5) a more user-friendly, yet economical line level. Still further objects and advantages will become apparent from a study of the following description and the accompanying drawings.

There are a number of reasons why an installer of any kind of cable on a surface would want or need to check the plumb or level of the cable being installed. The first reason is purely aesthetic: a plumb or level cable, when attached to the side of a structure where most corners, walls, windows and doors are plumb and level, is innately more attractive and appealing than a cable which is randomly stretched across an exterior wall. This is true even if the cable is just slightly off-level or off-plumb.

The second reason is related to the first in that the National Electric Code (NEC 2002) requires that high and low voltage cables "shall be installed in a neat and workmanlike manner." Amendments 110.12, 720.11, 760.6, 800.6, 820.6, and 830.7 respectively require that electrical equipment, circuits operating at less than 50 volts, fire alarm circuits, communications circuits and equipment, community antennas, and network-powered broadband communication circuits and equipment be "installed in a neat and workmanlike manner."

A third reason for the importance of installing a plumb or level cable or pipe is that many architects and home builders require in a structure's specifications that any visible cable or conduit to be plumb or level.

When installing plumbing, it is important that drainage pipes not be level, so to allow for proper drainage. A quick-attach level to such pipes, as a reference to slope, would be a very useful tool to the plumber.

BRIEF DESCRIPTION OF THE DRAWINGS

In the drawings, closely related figures have the same number but different alphabetic suffixes.

DETAILED DESCRIPTION OF THE DRAWINGS

Figure 1:
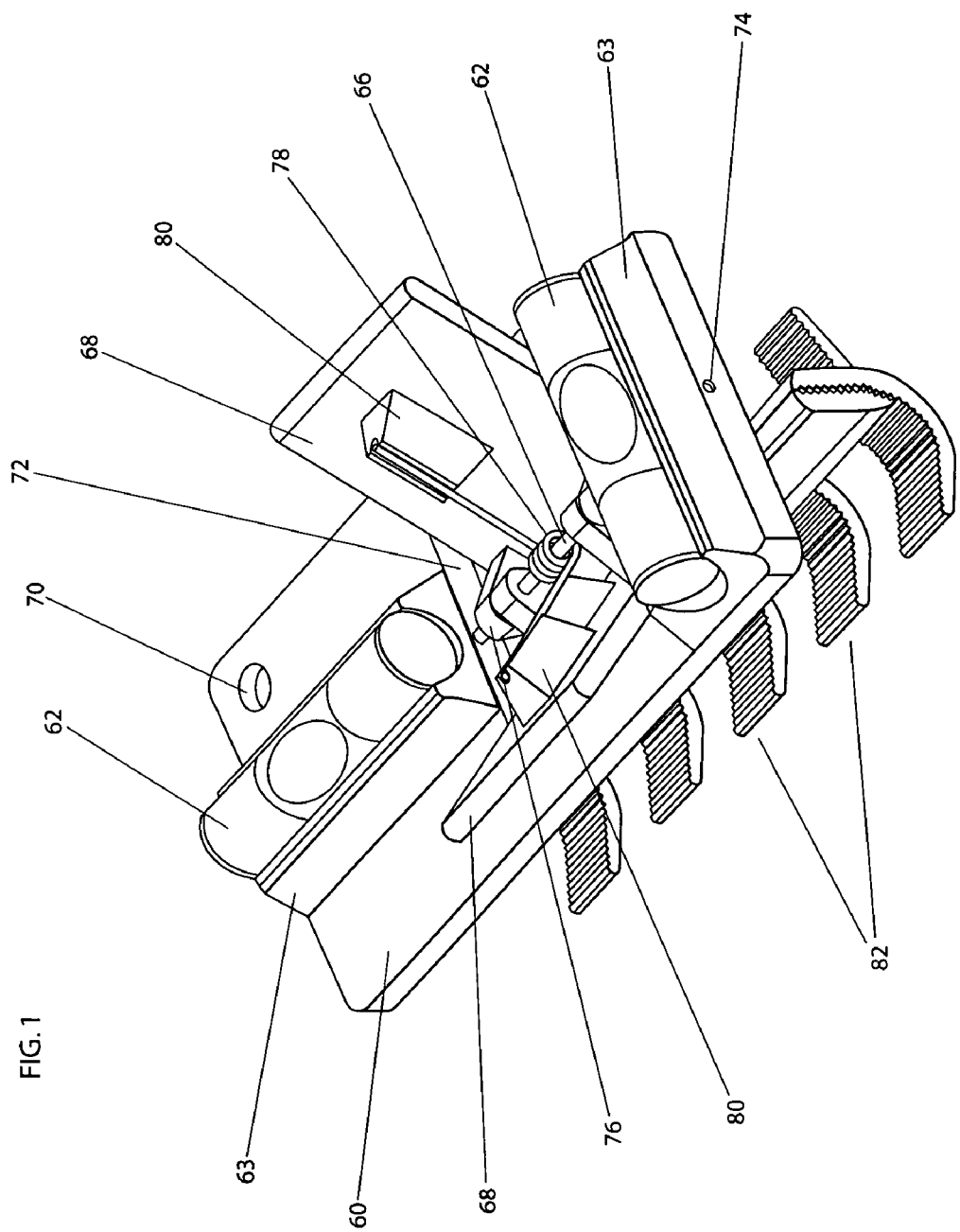
FIG. 1 is a top and perspective view of the preferred embodiment of the invention.

Referring to FIG. 1, it shows a perspective view of the preferred embodiment of the invention. The purpose of this embodiment is to provide a level-and-plumb level which will manually attach to various lines of different diameters. The level comprises of a flat body 60 with two level vials 62 attached to it, with the length of the level vials adjacent to the plane of the flat body. One level vial is placed parallel to the length of the flat body, and the other vial is placed perpendicular to the length of the flat body. Each vial is preferably placed at an opposite end of the flat body's length. In the center of the flat body is an opening 72, referred to as the butterfly clamp opening. On the underside of the flat body 60 is a butterfly-style clamp 68. The length of the butterfly clamp 68 is parallel to the length of the flat body's length, and the handles of the butterfly clamp penetrate through the butterfly clamp opening 72. The two handles extend above the top half of the flat body. Each handle aims upward and outward toward the outside edge of the flat body. The butterfly clamp is attached to the flat body via a pin which passes through the hinges of the clamp; this pin is fixed into the sides of the butterfly clamp opening 72, parallel with the flat body. At some point on the flat body is small penetrating hole 70. The purpose of this hole is to house a key ring or similar attachment.

Figure 2:
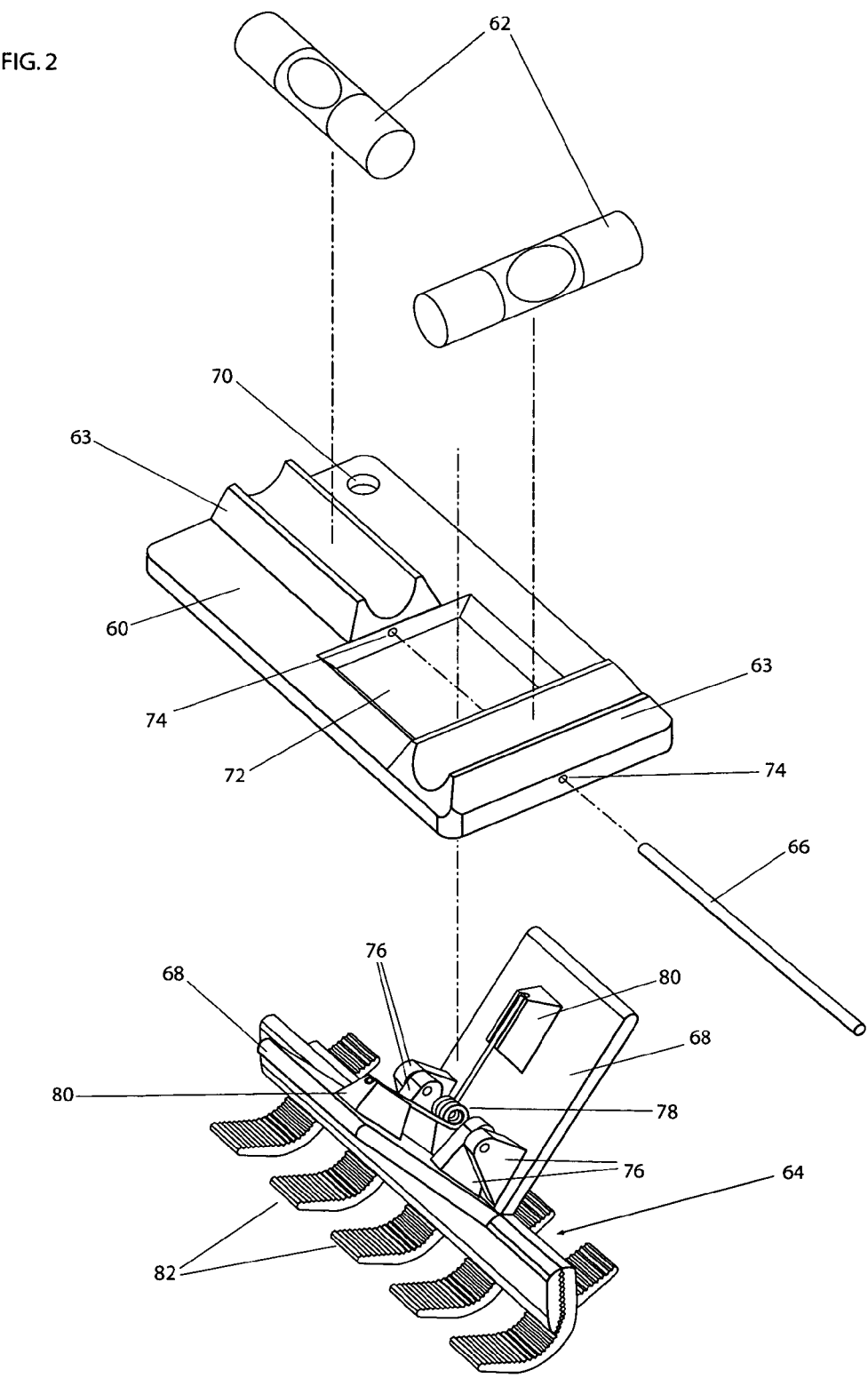
FIG. 2 is an exploded view of the level of FIG. 1.

FIG. 2 shows an exploded view of the level of FIG. 1.

In its preferred embodiment, the leveling tool of the present invention comprises four elements: a horizontal level vial 62, a perpendicular level vial 62, the flat body 60, and the butterfly clamp 64. Further, in its preferred embodiment, each level vial 62 is a standard design, approximately 2 mm to 3 mm in length and roughly 0.5 to 1 mm in diameter. It is preferably made of acrylic and filled with either clear or colored fluid. However, the body of the vial can be made of any hard, transparent material such as glass, plastic, Plexiglas, etc., and capped with any hard material such as plastic, nylon, acrylic, wood, metal, glass, Plexiglas, etc.

The preferred embodiment of the present invention also comprises a flat body 60 which is roughly 7 mm to 14 mm in length, 4 mm to 8 mm in width, and 0.2 to 0.5 mm in thickness. It typically has rounded corners for comfortable use and to avoid personal injury. It is preferably made of a hard plastic and the mounting flanges 63 are made of the same material. However, the flat body and mounting flanges can be made with any hard material such as metal, wood, Plexiglas, nylon, acrylic, etc. The mounting flanges will have the appropriate dimensions for retaining their respective level vials and be roughly 2 mm to 3 mm in length. Also, instead of the mounting flanges 63 pictured in FIG. 2, other objects for mounting or retaining the level vials can be used, such a retainer for each end of each level vial. The materials used for such a retainer would be the same as those mentioned above. The flat body and mounting flanges (or any other mounts or retainers) as a whole unit can be molded all at once, machined at once, or molded and/or machined in separate parts and assembled into one unit. The mounting flanges can be adhered to the flat body by virtue of heat treated adhesion, gluing, or even with screws or rivets. The butterfly clamp opening 72 ranges from approximately 1.5 mm to 5 mm in length, and from 3 mm to 6 mm in width.

The clamping means in the preferred embodiment of the invention comprise a butterfly clamp 64 which is a standard design of butterfly clamp; further comprising two halves connected by a metal pin 66 passing through each half's aligned hinges 76. Each half has a plurality of hinges 76, a handle 68 extending upward and outward above the hinges, and a plurality of prongs or teeth 82 curving down and inward below the hinges. Each half is a mirror image of its partner, with the handles 68 directly opposite each other, but with the spacing of the teeth 82 of each half staggered so that they (teeth) intertwine with one another when in a closed position. The pin 66 which passes through the aligned opposing hinges 76 also passes through a spring 78. The spring is set between the hinges and also between the two handles. Each end of the spring extends upward against each handle. There each of the spring's ends is stopped from sliding by pressing against a retainer 80, a small indentation or projection from the handle's surface. The spring now serves the purpose of pressing the handles apart and keeping the teeth clamped together in the clamp's defaulting position. The inner side of the curved teeth is lined with an abrasive surface. This is described in FIG. 3.

For the purpose of mounting the invention's butterfly clamp to the flat body 60, the pin 66 extends beyond the hinges on each side at least approximately 0.2 mm to 1.5 mm. This will serve for the pin's insertion into the sides of the butterfly clamp opening 72 in the flat body.

The length of the butterfly clamp as a whole is can range between 2.5 mm and 8 mm. The horizontal length of the handles is a roughly 3 mm to 6 mm, and the vertical length of the handles ranges from 1.5 mm to 3.5 mm. The width of the handles at their base ranges between 0.5 mm and 3 mm. Each hinge extends upward at a diagonal angle from its handle for roughly 0.5 mm to 2 mm. Each half of the butterfly clamp is roughly 0.2 mm to 0.3 mm in thickness, and is preferably made of hard plastic which has very slight flexibility. However the two halves of the clamp can be made with any hard material with very slight give, such as wood, metal, Plexiglas, acrylic, nylon, etc. The two halves would preferably be cast from a mold, but can also be cut or carved, etc.

The pin 66 ranges from 2 mm to 4 mm in length and is roughly 1 mm in diameter. The pin's length only needs to be slightly longer than the butterfly clamp opening 72. It is preferably made of stainless steel, although it can be made of any hard ungiving metal. The wire of the spring 78 is roughly 11 mm in diameter and the spring's coil ranges from 0.3 mm to 0.8 mm in length. It is made of stainless spring steel.

The level as a whole is an assembly of these different components. The two level vials 62 are placed into their respective mounting flanges 63 (which are permanently seated on the flat body). The handles 68 of the butterfly clamp 64 are passed through the butterfly clamp opening 72. The pin 66 is set into the pin holes in the sides of the opening. This can be done by routing away material from one of the pin holes 74, for example, on the underside of the flat body 60, setting the pin in place, then resealing the cavity.

Figure 3:
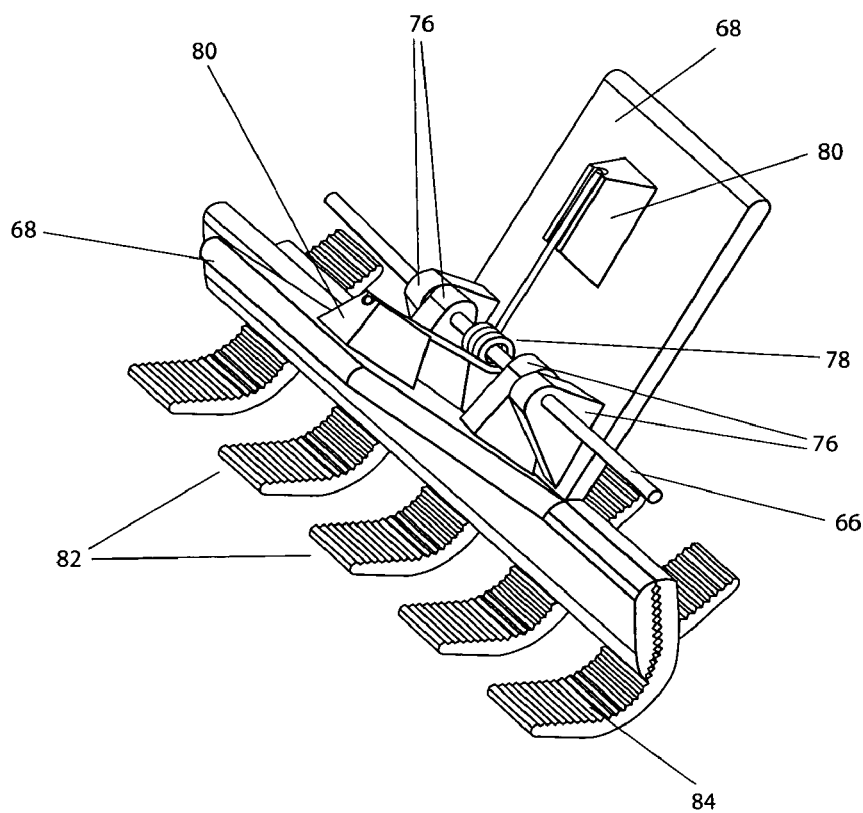
FIG. 3 is a perspective view of the preferred embodiment of the butterfly clamp of the level of FIG. 1, showing the inside of the clamp's teeth.

FIG. 3 illustrates a perspective view of the preferred embodiment of the butterfly clamp of the level of FIG. 1. To prevent the clamp from sliding when clamped to a line, an abrasive or frictional surface is set on the inside curves of the teeth 82 of the clamp. In the preferred embodiment, a rough texture or abrasive surface 84 is furrowed into the inner surface of the teeth 82. This can be done by sanding, engraving, cutting or carving into the existing surface. It can also be done by making the texture part of the mold if the butterfly clamp is cast. Another option for creating an abrasive surface on the inside of the clamp's spine and teeth is to apply the surface with a gripping material. The preferred material is rubber, but can be any similar type of flexible, frictional material, such as foam rubber, vinyl, foam, or fabric. The material can be applied and attached to the butterfly clamp by being cut to fit and then glued to the surface. The material can also be cut to fit and attached by virtue of an extrusion of liquid plastic (which will form the body of the clamp) onto one side of the material.

Figure 4:
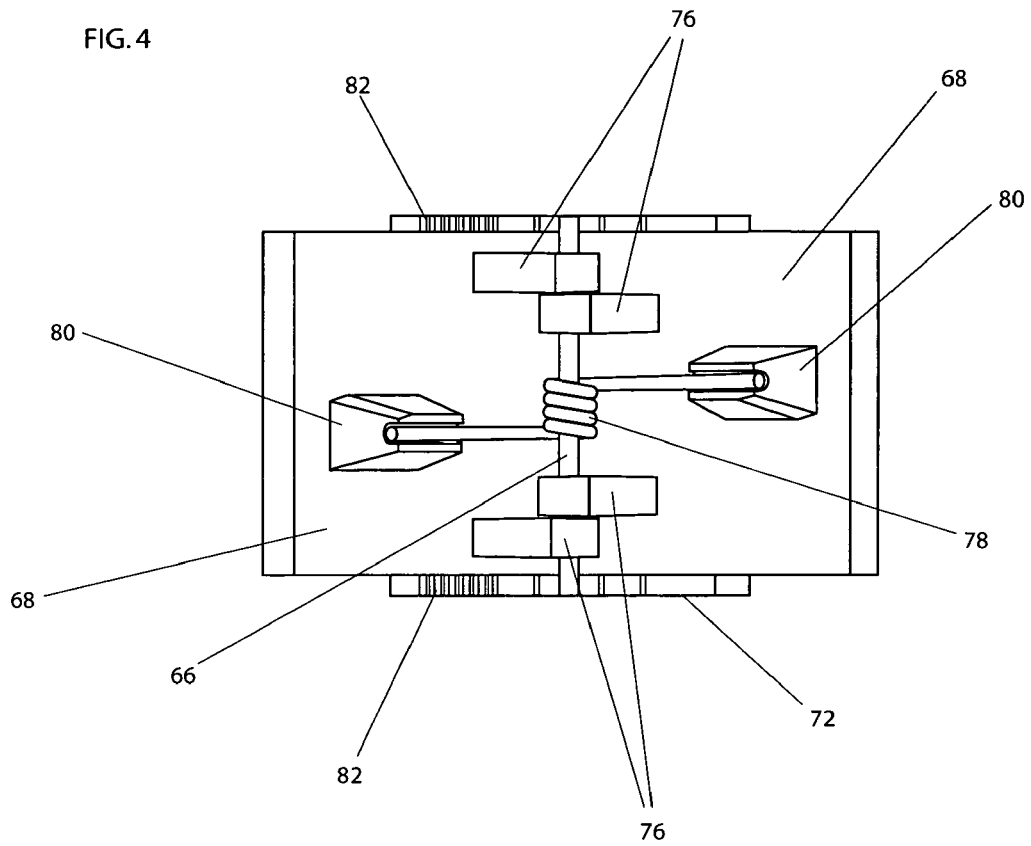
FIG. 4 is detailed view of the spring hinge of the butterfly clamp of the level of FIG. 1, penetrating the central opening, viewed from above.

FIG. 4 shows a detailed view of the spring hinge of the butterfly clamp of the level of FIG. 1, viewed from above, penetrating the butterfly clamp opening 72. The pin 66 is aligned through the hinges 76 and spring and set into the sides of the opening. The spring ends extend against the handles 68 and are retained by the spring retainers 80. This keeps the clamp in a closed position by default.

Figure 5A:
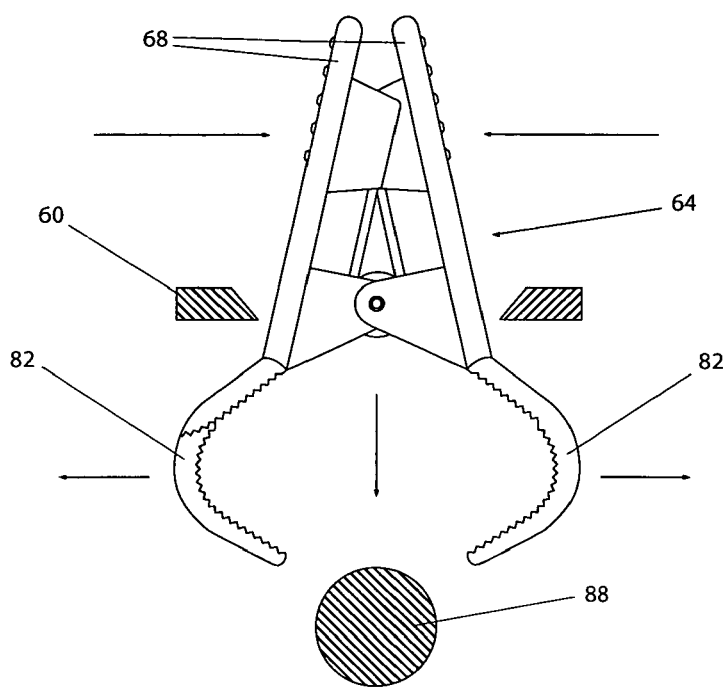
FIG. 5A is a lateral cross-sectional view of the butterfly clamp and body of the level of FIG. 1, showing the clamp in the process of attaching to a cable or line.
Figure 5B:
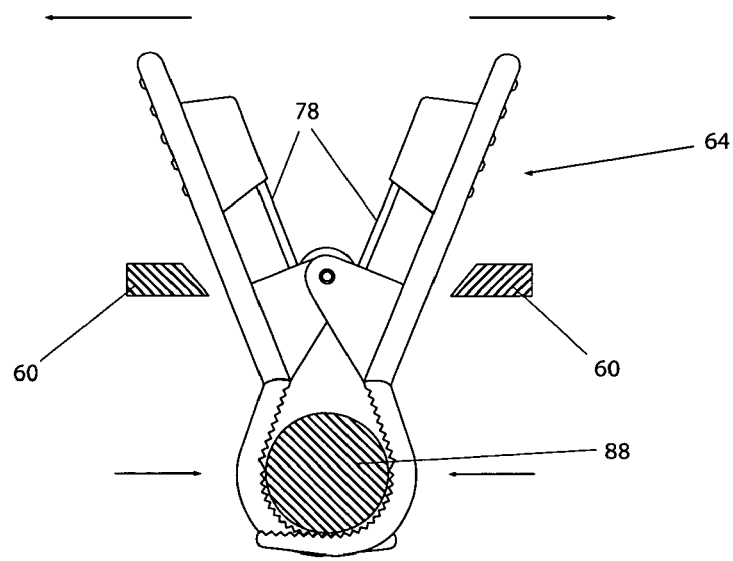
FIG. 5B is a lateral cross-sectional view of the butterfly clamp and body of the level of FIG. 1, showing the clamp clamped to a cable or line.

Referring to FIG. 5A, it shows a lateral cross-sectional view of the butterfly clamp and body of the level of FIG. 1, showing the clamp in the process of being attached to a cable or line. As the user squeezes the handles 68 together, the teeth 82 pull apart. The user then attaches the clamp to the desired cable or other line. FIG. 5B is a lateral cross-sectional view of the butterfly clamp and body of the level of FIG. 1, showing the clamp clamped to a cable or line. When the user of the level releases the handles, the spring presses against the handles, closes the teeth and remains clamped the cable.

Figure 6B:
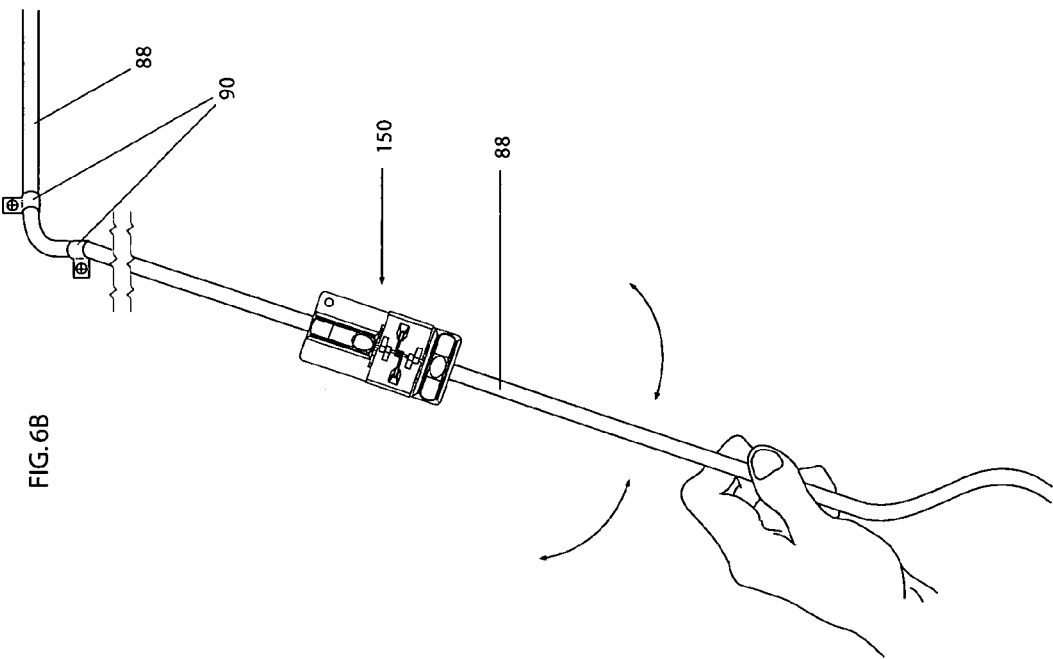
FIG. 6B shows the level of FIG. 1 attached to a cable.
Figure 6A:
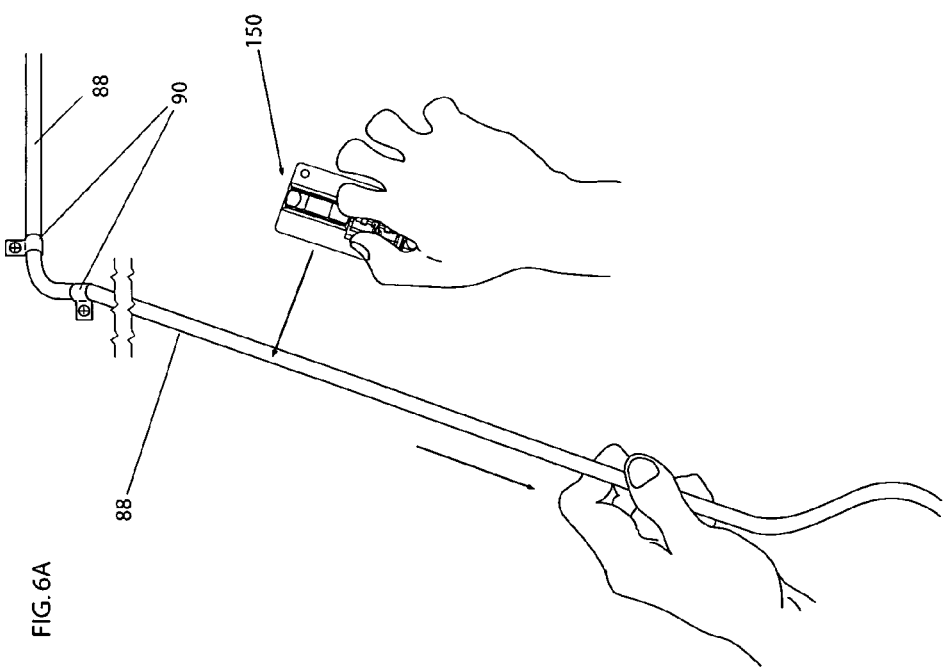
FIG. 6A shows the typical use of the level of FIG. 1, with the level being attached to a vertical wall-mounted cable, before the cable's adjustment.

FIG. 6A shows the preferred method of use of the level of FIG. 1 with the level 150 being attached to a vertical wall-mounted cable 88, before the cable's adjustment. Again, the user applies the level by compressing the handles and then releasing after attachment.

FIG. 6B shows the level attached to the cable.

Figure 7:
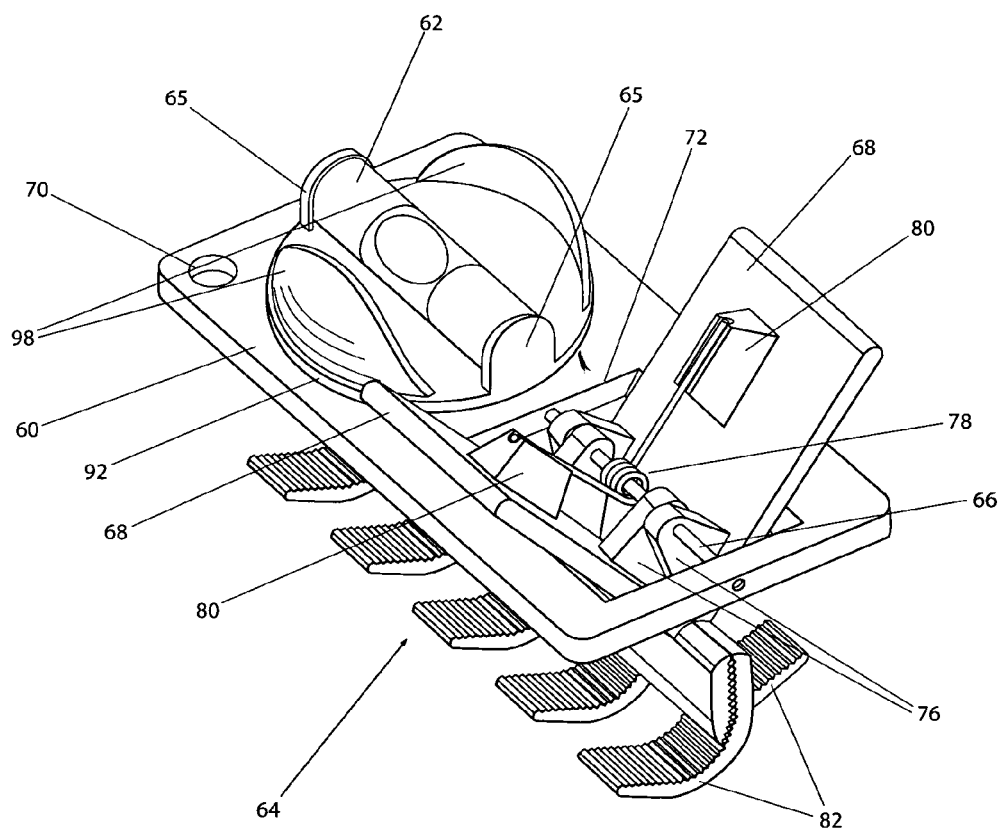
FIG. 7 is a perspective view of an alternative embodiment of the level of FIG. 1, comprising a rotating plumb/level disc.

FIG. 7 is a perspective view of an alternative embodiment of the level of FIG. 1, possessing a rotating plumb/level disc. The purpose of this embodiment is to provide a level-and-plumb level which will manually attach to various lines of different diameters, using one adjustable level vial instead of two fixed vials. This design is similar to the preferred embodiment in that it possesses a flat body 60 with a butterfly clamp opening 72, a key ring hole 70, and a butterfly clamp 64 attached to the flat body with a long pin 66 in the clamp opening. The preferred and alternative materials used, and manufacturing methods employed, for the production of this butterfly clamp are the same as those given for the butterfly clamp of the level of FIG. 1. The dimensions for this embodiment of the butterfly clamp are also the same as those given for FIG. 1's level. Either the preferred embodiment of the butterfly clamp given in FIG. 3 or an alternative embodiment can be used in this embodiment of the level. The method for attaching the level to a cable or line with the butterfly clamp is the same as the method given in FIG. 6A. The width of the flat body 60 is approximately 4 mm to 8 mm, and its thickness is roughly 0.2 mm to 0.5 mm. The butterfly clamp opening 72 ranges from 1.5 mm to 5 mm in length, and from 3 mm to 6 mm in width. In this embodiment, the butterfly clamp opening is shifted to occupy one end of the flat body's length or the other. In the space remaining on the flat body 60 is situated a disc containing a level vial which can rotate into different positions. This disc is referred to as the plumb/level disc 92. It consists of a preferably round disc which houses a level vial 62. On either side of the vial is a grip meant for a user to grab and rotate the disc; these are referred to as the disc grips 98. The plumb/level disc 92 can be rotated into four locking positions, which place the level vial 62 into one of two alignments. One of the alignments is parallel with the length of the flat body 60, and the other position is perpendicular to the length of the flat body.

Figure 8:
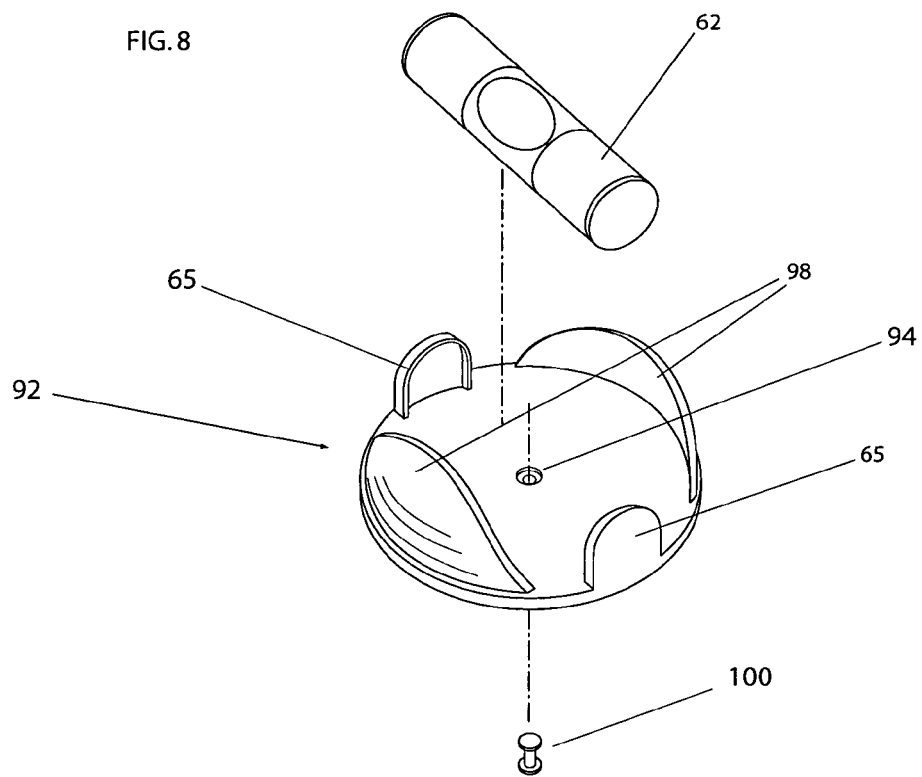
FIG. 8 is an exploded view of the plumb/level disc of the level of FIG. 7.

FIG. 8 is an exploded view of the plumb/level disc of the level of FIG. 7. The disc comprises three essential elements: a level vial 62; a mount to contain it, which is the plumb/level disc 92; and a pin 100 which will unite the disc to the flat body of the level. The level vial 62 is the same kind as the vials used for the level of FIG. 1, made with the same materials, and the same dimensions.

The plumb/level disc 92 in the preferred embodiment is made of a hard plastic and the same material that is used for the flat body. However, it can be made of any hard material with slight flexibility, such as nylon, acrylic, metal, wood, etc. It is roughly 3 mm to 4 mm in diameter and 0.1 mm to 0.3 mm thick at its base.

In this illustration the objects which retain the level vial in the plumb/level disc 92 are caps referred to as the vial retainers 65. They are simply caps which are a solid part of the disc as a whole. Their width and height are generally slightly greater than the diameter of the level vial they will restrain. They are concave on their sides facing the center of the disc. They are flexible enough to insert the level vial into during manufacture, and hard enough to hold the vial in place. Although the vial is illustrated to be retained with these types of retainers in this embodiment, other types of retainers or mounts for the vial can be used, such a mounting flange.

Between the two vial retainers 65 are two grips referred to as the disc grips 98. Their purpose is to allow the user to grab hold of the plumb/level disc when rotating it. They are basically two ergonomic projections which extend from the base of the disc and allow for a comfortable, firm grip. In the center of the plumb/level disc is a through-hole, referred to as the disc pin hole 94, which houses the pin which will unite the disc to the flat body. Its diameter is typically 1 mm to 0.3 mm.

The plumb/level disc is all one solid piece of material and can be formed from a mold and/or with machining. There are undoubtedly pre manufactured plumb/level discs of this nature on the market which are appropriate for implementing onto this level. In this case, the bumps or lobes on the flat body would be matched to the dimples or recesses used on the underside of the disc. The pin holes on the flat body would also match the pin hole of the level disc.

Inserted into the disc pin hole 94 is the disc pin 100. This pin will unite the plumb/level disc to the flat body. Its diameter at the shaft is slightly less than the diameter of the disc pin hole 94. It is preferably a hollow cylinder made of a hard, durable metal with some pliability, such as zinc, brass, tin, aluminum, etc. However, it can be made of any hard metal. Its length is slightly longer than the width of the sum of the thickness of the plumb/level disc and flat body when pressed together. The preferred method of assembly is inserting the disc pin through the pin holes of both the plumb/level disc and the flat body while the plumb/level disc is set in its default position (and before the level vial is inserted). Then the manufacturer would compress both ends if the cylinder to be wider than each pin hole's orifice, creating a rivet which unites the two objects. The level vial would be inserted after attachment. Alternative means of uniting the plumb/level disc and the flat body could be with a standard rivet through the pin holes, using a riveting tool. A screw and nut can also be used, or any other object or objects which create an adequate axle for the disc and the body, which the manufacturer finds appropriate to use.

Figure 9:
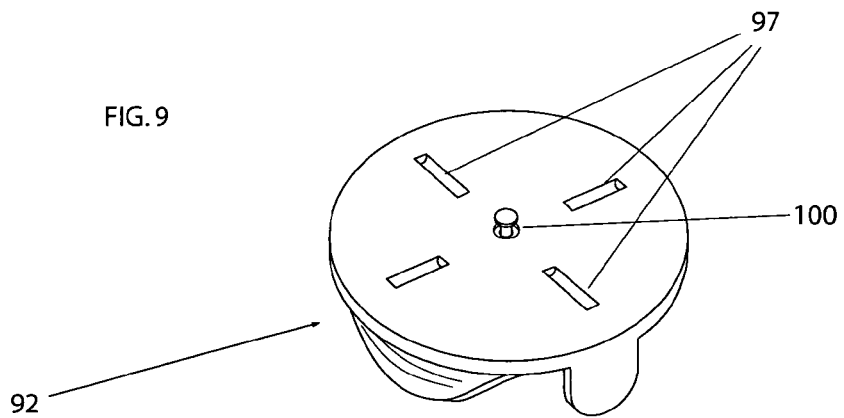
FIG. 9 is a perspective view of the plumb/level disc of the level of FIG. 7, showing the bottom.

FIG. 9 is a perspective view of the plumb/level disc of the level of FIG. 7, showing the bottom. Shown are the disc pin hole 94, disc pin 100, and four dimples or recesses referred to as disc-locking recesses 97. The concave dimensions of the recesses are roughly the same as those of the disc-locking bumps on the flat piece. All four recesses radiate outward from the disc pin hole 94. Each recess is placed 90 degrees apart from each other. Two of the recesses are aligned parallel with the level vial which is on top of the disc. The other two recesses are aligned perpendicularly to the length of the vial. Each of the four recesses are positioned from the disc pin hole 94 at the same distance that each of the disc-locking bumps are positioned from the pin hole on the flat body. Thus the disc-locking recesses 97 of the disc are a mirror image of the disc-locking bumps of the flat body.

Referring to FIGS. 5A, 5B, 6A, 6B, one can easily discern the method of this invention as applied to the various embodiments disclosed herein. In the preferred embodiment of the method of use of this invention, a user grabs the level 150 at the handles 68 and squeezes them while positioning the level onto the cable 88 or line he/she wishes to check. When the level is positioned, the user relaxes the handles and leaves the level clamped to the line. This frees up at least one hand to do any number of tasks related to the install, such as retrieve a hand drill for the line's attachment. Only one hand is needed to adjust the line into a level or plumb alignment, which is a considerable advantage for installers who work against a deadline. The plumbness of the level is checked via one level vial 62, and levelness is checked by the other level vial 62. The line is attached appropriately and the level is removed by again squeezing the handles and then lifting the level off of the line. If a key ring or similar device is attached to the level, the level can be stored on an installer's tool belt via a clip.

This invention also comprises numerous alternative structural and method of use embodiments as disclosed and claimed herein below.

I claim:

1. A leveling and plumbness tool, said tool comprising:
   a. a rectangular flat body comprising a top side, a bottom side, an opening generally located in the center of the flat body, and a side opening, said side opening being capable of receiving a key chain, a key ring or a belt ring, said flat body further comprising at least one mounting flange placed in the flat body's top surface;
   b. at least one leveling vial capable of being received by the mounting flange;
and
   c. attaching means comprising a grip and a clamp so that placing pressure on the grip causes the clamp to open and releasing the pressure causes the clamp to close, said attaching means being placed in the flat body's opening and being firmly engaged to the flat body, in such a manner that the grip is manually reachable above the plane of the flat body's top surface and the clamp is placed below the plane of the flat body's bottom surface, said clamp comprising a plurality of teeth, said teeth comprising an outer surface and an inner surface, said inner surface being capable to firmly wrap around cylindrical objects of varying diameters and being covered with gripping material selected from the group consisting of rubber, foam rubber, vinyl, foam and plastic, the length of said attachment means being parallel to the length of the flat body, said attaching means being capable of being manually operated.

2. The leveling and plumbness tool according to claim 1 wherein the leveling vial is placed on the mounting flange parallel to the length of the flat body and a second leveling vial is placed on a second mounting flange perpendicularly to the length of the flat body, each vial being placed at opposite ends of the flat body without crossing the center opening.

3. The leveling and plumbness tool according to claim 1 wherein the attaching means is a butterfly clamp.

4. The leveling and plumbness tool according to claim 1 comprising the leveling vial seated in the mounting flange, said mounting flange placed on a rotating disk, said rotating disk being engaged to the top surface of the flat body so that the rotating disk can be rotated into four different locked positions, thus placing the leveling vial into one of two perpendicular alignments, one alignment being parallel to the length of the flat body and the other alignment being perpendicular to the length of the flat body.

5. A method for plumbing or leveling a cylindrical line with a self-adhering leveling and plumbing tool, comprising the steps of:
   a. providing the leveling and plumbness tool described in claim 1;
   b. retrieving and attaching the leveling and plumbing tool to the line using said tool's attaching means or fastening means;
   c. manually adjusting the line to either level or plumb by referring to the tool's appropriate level or plumb vial and adjusting the line up or down, or left or right, until the line is level or plumb;
   d. attaching the line to its surface or structure using conventional tools; and
   e. removing the leveling and plumbing tool from the line.

* * * * *